3,649,583
WATER CLEANABLE EPOXY ADHESIVE
Victor M. Guthrie, Olean, N.Y., assignor to The Dexter Corporation, Windsor Locks, Conn.
No Drawing. Filed Apr. 10, 1970, Ser. No. 27,463
Int. Cl. C08g 51/26
U.S. Cl. 260—30.4 EP                               8 Claims

ABSTRACT OF THE DISCLOSURE

A water cleanable epoxy based adhesive is prepared from a liquid epoxy resin, a monoglycidyl ether, a water dispersible surfactant and a polyamide hardener.

---

The present invention relates to novel epoxy resin based adhesive compositions, and particularly to epoxy resin based adhesive compositions which are water cleanable. The compositions of the present invention find particular utility in bonding glass or other transparent materials, wherein the excess adhesive surrounding the bonded joint must be removed following the bonding operation.

The prior art has long sought an epoxy adhesive which can be simply cleaned up. In most bonding operations a certain amount of adhesive is excess or surplus and must be removed after the joint being bonded is clamped. The removal of the excess adhesive is particularly important when one or more of the parts being bonded is transparent. Although the prior art has provided epoxy adhesives which may be cleaned up with solvents, solvents simply dilute the adhesives and leave a film residue without entirely removing the adhesives. Other approaches have developed adhesives which can be cleaned, but the adhesive power is substantially destroyed. The present invention overcomes these problems by providing a water cleanable epoxy based adhesive which has good adhesive properties.

It has been discovered that an epoxy based adhesive, which is water cleanable in its uncured form, can be produced from a liquid epoxy resin, a monoglycidyl ether, water dispersible surfactant, and a polyamide hardener having a fairly high amine number.

The epoxy based adhesives of the present invention are preferably two-package systems, wherein the two packages are mixed together prior to use to give an adhesive which has good shelf life and good cure in 24 hours at 25° C. or 2 hours at 60° C. The adhesives of the present invention have the distinct advantage of being water cleanable prior to curing simply by using warm water and mechanical rubbing to remove the uncured adhesive. Elimination of any one or two of the essential ingredients tends to destroy the water cleanable feature of the epoxy adhesive of the present invention. Substitution for any of the essential ingredients by a chemically similar product will retain the water cleanable feature, but may cause a loss in adhesive strength. The concentration of the prime ingredients has not proven to be highly critical, but excess quantities of diluent or surfactant will tend to reduce the adhesive strength of the composition.

In order to produce a successful water cleanable adhesive in accordance with the present invention, it has been found essential that the adhesive include a nonionic surfactant, a monoglycidyl ether, and a polyamide hardening agent in addition to the liquid epoxy resin. These three components may be combined with a wide variety of epoxy resins. The compositions of the present invention also may contain the conventional fillers, accelerators, and plasticizers, as will be obvious to those skilled in the art, although it has been found that some fillers are preferred in that they produce superior adhesive properties.

The epoxy resins which may be used in preparing the adhesives of the present invention encompass a wide range of epoxy resins. In general they must be liquid and must contain a plurality of epoxy groups capable of reacting with a curing agent. The typical commercially available epoxy materials are complex reaction products of polyhydric phenols with halohydrins. A large number of this type of epoxy resins are disclosed in Greenlee Patents 2,585,114 and 2,589,245.

Typical polyhydric phenols useful in the preparation of epoxy resin for use in the present invention include resorcinol, various bisphenols resulting from the condensation of phenol with aldehyde and ketones such as formaldehyde, acetaldehyde, acetone, methyl ethyl ketone, and the like, and low molecular-weight phenol-aldehyde condensation products of novolac resins. The preferred epoxy resins are the bisphenol type. A typical epoxy resin within this category is the reaction product of epichlorohydrin and 2,2-bis(p-hydroxy phenyl) propane, hereinafter referred to as bisphenol A, the resin having the following theoretical structure formula:

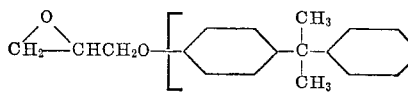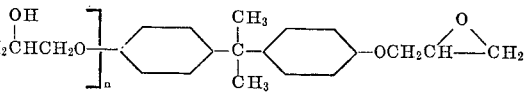

where $n$ is 0 or an integer up to about 5. Generally speaking $n$ will be less than 2 or 3, since when $n$ is 3 or more the products are solids.

The novolac epoxy resins, that is those epoxy resins having a phenolic novolac backbone and the cycloaliphatic epoxides can also be used either separately, or mixed with the bisphenol A type epoxy resins for use in the present invention.

The epoxy resins which may be used in the present invention may be characterized further by reference to their epoxy equivalent weight. For purposes of this application, the epoxy equivalent weight shall mean the mean molecular weight of the pure epoxy resin divided by the mean number of epoxy radicals per molecule. While certain specific epoxy resins, which are the most readily available, have been described above in the generic formula, it is understood that the epoxy resinous compositions encompassed by this invention are those liquid epoxy resins having an epoxy equivalent weight of from about 170 to about 300, and preferably from about 170 to 250. In general the epoxy resins having an epoxy equivalent weight above about 300, are solid and are not particularly useful for the present invention, although it is possible to mix a small proportion of a solid epoxy resin with sufficient liquid epoxy resin to dissolve the solid epoxy resin to make a useful liquid mixture.

In preparing the adhesives within the present invention it is essential that a surfactant be used. While there are many types of surfactants which are useful, it has been found that surfactants which are readily dispersible in water produce the preferred results. Non-ionic water soluble surfactants have produced outstanding results. Although it is not necessary to use a large quantity of surfactant, and as little as 0.05% by weight of the total composition has been successfully used, it is possible to use as much as 1% by weight of the surfactant. It is preferred to use from about 0.1 to about 0.2% by weight.

Preferably the surfactant is divided, with a portion being in each package, although the separation is not essential. Generally it has been found necessary to use nonionic type surfactants. Those surfactants produced by the reaction of propylene oxide and ethylene diamine, followed by the reaction with ethylene oxide, have produced very good results. Good results have also been obtained using nonylphenol polyethylene glycol ethers, sorbitan monostearate, and polyoxyethylene sorbitan monostearate. It has been found that the more soluble the detergent, the better cleanability of the resulting adhesive is. It will be obvious to those skilled in the art, that other liquid nonionic surfactants than those disclosed above could be substituted into the present invention.

The preferred surfactant is a liquid oxypropylene-oxyethylene polyol made from ethylene diamine sold under the trade name Tetronic 901. It has an average molecular weight of 4750, a functionality of 4 and a hydroxy number of 47.

Other commercially available surfactants which are useful include Tergitol NPX which is a non-ionic surfactant produced from one mole of nonyl phenol and 10.5 moles of ethylene oxide; Span 60 which is sorbitan monostearate; and Tween 60 which is one mole of sorbitan monostearate condensed with 20 moles of ethylene glycol.

It is essential that the epoxy based adhesives of the present invention include a monoglycidyl ether. Although it has been found that several commercially available monoglycidyl ethers can be used, best results have been obtained by using cresyl glycidyl ether. Good results have also been obtained using phenyl glycidyl ether and butyl glycidyl ether. Other alkyl glycidyl ethers wherein the alkyl group varies from 2 to 8 carbon atoms may be used, as well as other aryl glycidyl ethers and alkaryl glycidyl ethers containing up to about 12 carbon atoms and mixtures thereof. It is generally preferred to use monoglycidyl ethers having molecular weights below about 180 and having viscosities of no more than about 100 centipoises at room temperature.

It has been found that the water cleanable adhesives must contain at least 1% by weight of a monoglycidyl ether, based on the weight to the complete adhesive composition, in order to give good water cleanability. As much as 10% by weight of the monoglycidyl ether can be used. The effect of increasing the proportion of monoglycidyl ether reduces the viscosity of the composition, and the upper limit on the monoglycidyl ether is governed by the lower limit of the viscosity which is desired.

The third essential ingredient, in addition to the epoxy resin per se, is a liquid polyamide hardening agent. The polyamides which are useful in the present invention are products of the condensation of simple amines such as ethylene diamine, ethylene triamine, triethylene tetramine, tetraethylene pentamine, etc. with long chain fatty acids. The chemical identity of the raw materials is for all practical purposes lost in the process by which the polyamides are produced, but the critical feature of the polyamide hardening agents is that they must be polymeric amines of relatively low amine content. This feature gives the hardening agents low volatility, low toxicity and low, but controllable, reaction rates with epoxy resins. The critical features of the polyamide hardening agents are viscosity and amine value. For use in the present invention it has been found that the hardening agent must be polyamide amines having viscosity between about 2 and 40 poises, and amine numbers of from about 400 to about 650. The amine number referred to herein is the number of milligrams of potassium hydroxide equivalent to the amine groups in one gram of the polyamine product, as determined by titration with HCl. The amine number thereby indicates the amine groups available for reaction and serves as an indication of the reactivity of the compound.

The polyamide compounds which serve as the hardening agent in the adhesive of the present invention, are derived by the reaction of a polyamine and a fatty acid. The polyamines which may be employed in preparing the amino containing compounds are the alkylene polyamines such as ethylene diamine, diethylene triamine, tetraethylene pentamine, di-1,3-propane triamine, di-1,2-propane triamine and the like. The polyamines can be represented by the formula $H_2N(RNH)_nH$ wherein R is an alkylene radical and $n$ is an integer from 2 to 6. While the alkylene radical is generally ethylene, alkylene radicals having up to 6 carbon atoms are suitable.

The polyamides which are preferably used in the present invention are those derived by reacting the previously mentioned polyamines with the polymeric fatty acid. The amidification reaction may be carried out in the usual conditions. The production of these compounds is described in Canadian Pat. 764,520.

One of the preferred hardening agents for use in the present invention is a fatty amido amine resin sold under the trade name of Genamide 250. This material is produced by the condensation of tetraethylene pentamine and an unsaturated fatty acid (tall oil acids) to give a product having an amine number of about 435 and a viscosity at 25° C. of about 10 poises.

Another commercially available hardening agent which has given good results is sold under the trade name of Genamide 2000. This material is said to be an amino linked polymer of methyl epoxy stearate and tetraethylene pentamine having an amine number of about 600 and a viscosity at 25° C. of about 30 poises. Other polyamides having amine values of between about 400 and 650, with viscosities between about 2 and 40 poises, measured at 25° C., are also useful in the present invention.

In producing the water cleanable adhesives of the present invention it is generally preferred to have a stoichiometric excess of polyamine hardener as compared to the epoxy groups present. It is quite customary in the field of epoxy based adhesives to use rather large excesses of polyamide hardeners to achieve flexibility in the cured product. Since the polyamides are multi-functional, it is not necessary to utilize every reactive site to tie the polyamide firmly into the structure. Problems arise however, in that large excess of amine groups tend to leave the product somewhat sensitive to water. However, it has been found that some excess amine group promote water cleanability of the uncured system.

The water cleanable adhesives of the present invention contemplate an operable stoichiometry of the polyamide hardener of from about 90% to about 200% of that required by the epoxy groups present. However, the preferred ratio is about 100–150% of hardener based on theoretical stoichiometric amount required by the epoxy groups present. A slight excess hardener tends to toughen and flexibilize the cured system, thus giving a better adhesive. In computing the stoichiometry, all amine functional accelerators should be computed as part of the hardener, and the monoglycidyl ether should be considered as part of the epoxy resin. In Example I, and the other examples given below, the hardener component provides nearly 120% of the stoichiometric requirement of the resin component.

While the polyamide type hardeners described above are essential to producing a successful water cleanable adhesive, it has been found that the essential polyamides can be mixed with other polyamines as auxiliary hardeners and used to produce adhesives which retain water cleanability. For instance, it has been found that up to 50% of the essential polyamide (based on the amine number) can be replaced with a non-preferred or auxiliary polyamine and still retain water cleanability. The replacement of the essential polyamide must be based on the amine functionality. In other words about 65 parts by weight of an essential polyamide having an amine functionality of about 500 may be mixed with about 35 parts of an auxiliary polyamine having an amine functionality of about 250 and the mixture used to replace 100 parts by weight of the essential polyamide. Blends of hardeners have been found useful in various applications in order to provide specific properties. For instance, it has been found that the use of a small amount of polyamines such as tetraethylene triamine or an accelerated amine of equivalent weight 31 sold under the trade name of Epi-cure 874 does not destroy the water cleanable feature of the epoxy adhesives of the present invention, but these materials lower the viscosity and improve the elevated temperature properties.

In addition to the essential materials, discussed above, auxiliary materials may be used with the adhesive of the present invention. For instance, plasticizers or extenders can be used to give the adhesive additional flexibility or to reduce the viscosity. Likewise dyes and pigments may be used which do not interfere with the chemical process by which the epoxy adhesive cures. As was mentioned above, many different types of fillers can be used, although, depending upon the proportion used, adhesive properties of the compositions may be affected. It has been found that talc is the preferred filler for obtaining adhesives with the highest adhesion. Other fillers are quite satisfactory for their purposes.

It has been found desirable in some cases to use an accelerator, or a catalyst to cure the epoxy based adhesive. Such materials as Epi-cure 874, which is a polyamine accelerator-catalyst described above can be used to adjust the gel time of the adhesive. However, the presence or absence of the accelerator does not affect the cleanability of the basic epoxy resin adhesive. Other material such as phenol and amine containing compounds can be used to speed up the cure of the adhesives.

Plasticizers such dioctylphthalate, dibutylphthalate and similar alkylphthalates can be used as plasticizers. Additionally, high boiling mineral oils such as those sold under the trademark Mobisoil, coal tars, and other materials may had as desired to adjust the adhesive properties. None of these plasticizers appear to have any profound effect on the water cleanability of the adhesive.

Various amine functional silanes have been used to improve the wetting of glass by adhesives for use in bonding glass to other materials. Again, such silanes are not critical to the water cleanability of the adhesives. Pigments such as carbon black have been used successfully. Fillers such as asbestos to improve the thixotropic properties have been used. Although asbestos was found to be the preferred material for producing thixotropic materials, silica aerogels and colloidal silicas such as those sold under the trademark of Cab-o-sil and others may be used.

The following examples will serve to illustrate the preparation of epoxy adhesives within the present invention, but it is understood that these examples are set forth merely for illustrative purposes and many other water cleanable epoxy adhesives are within the scope of the present invention. Unless otherwise stated, all parts are in terms of weight.

EXAMPLE 1

A two package epoxy adhesive, having good water cleanable properties was produced as follows. The resin component was made by mixing together the following materials:

| | Parts |
|---|---|
| Bisphenol A-epichlorohydrin epoxy resin (epoxy equivalent weight 190) [1] (0.248 eq.) | 47 |
| Cresyl glycidyl ether (0.027 eq.) | 4.5 |
| Nonionic water soluble surfactant [2] | 0.1 |
| Dibutylphthalate (plasticizer) | 2 |
| Talc (filler) | 40 |
| Total (0.275 eq.) | 93.6 |

[1] This material is sold under the trade name ERL–2772.
[2] The surfactant is sold under the trade name Tetronic 901, and is produced by the addition of propylene oxide to ethylene diamine, followed by the addition of ethylene oxide.

The resulting resin contained approximately 0.294 epoxy equivalents per 100 parts by weight.

The hardener portion of the adhesive composition was made by mixing together the following materials:

| | Parts |
|---|---|
| Fatty acid amido amine resin [1] (hardening agent) (0.50 eq.) | 40 |
| Epi-cure 874 polyamine (accelerator) (0.161 eq.) | 5 |
| Nonionic water soluble surfactant [2] | 0.1 |
| Polyester plasticizer | 5 |
| Talc (filler) | 49 |
| Total (0.661 eq.) | 99.1 |

[1] The amine resin was sold under the trade name Genamid 250, and is produced by condensing tetraethylene pentamine and tall oil acids to produce an amido amide having an amine number of about 435 and a viscosity at 25° C. of about 10 poises.
[2] Same as Example I.

The hardener component contained approximately 0.667 amine equivalents per 100 parts by weight.

Each package is mixed by adding each ingredient, in turn, with mechanical mixing after each addition to insure uniformity. After all the ingredients have been added and mixed, the component is de-aired under vacuum, and packaged.

To use the adhesive, two parts of the resin component are mixed with one part of the hardener component. The measurements can be made either by weight or by volume. This ratio gives 1.17 amine hydrogen equivalents for each epoxy equivalent. The mixing can be accomplished by hand or by mechanical means, with mechanical means being preferred in those cases in which more than ½ pint of it is being mixed. Once the adhesive is mixed, it must be used within about 60 minutes. The adhesive will cure sufficiently in 24 hours at 25° C. or at 2 hours at 60° C. and is water cleanable for at least 60 minutes. Typical tensile shear tests for bonding chromic acid etched, ¹⁄₁₆ inch aluminum is 2200 p.s.i. at 25° C. for this adhesive.

The adhesive compound may be cleaned up with warm water any time up until the material gels. The ease and degree of cleanability have been determined by the following procedure:

(1) Approximately 1 gram of a mixed adhesive is smeared onto a clean glass plate over an area of about 4 inches by 4 inches.

(2) Warm tap water (100–120° F.) is run over the surface of the smeared adhesive.

(3) The wet adhesive is slightly rubbed with the finger and the glass plate is placed again under the running warm tap water.

(4) The rubbing-rinsing action is repeated as often as necessary until the glass plate is cleaned.

The adhesives within the present invention, when subjected to the above described tests, when spread on the glass about 5 mils thick will clean up completely in the first cycle. Films of adhesives within the present invention of 10 mils thickness take two or three wash cycles. If more severe rubbing action is used, 100 mil films can be cleaned with only one wash cycle. Thin films will wash off completely if left under running water for a few minutes. Ease of cleanability is enhanced as the wash water temperature increases.

As the awater is allowed to run over the adhesive films, those adhesives within the present invention, the film becomes milky in color upon initial contact with water. The rubbing action produces what appears to be a non-foaming emulsion which is quite easily removed by wiping or rinsing. The adhesives of the present invention, when cleaned with water, as described above, are removed from the glass without any residue on the substrate surface. The absence of residue is quite apparent on glass or highly polished surfaces. This is in contra-distinction to epoxy adhesives which are cleaned up with solvent. Such solvent cleaning normally leaves a residue which is difficult to remove.

EXAMPLES 2–8

A series of water cleanable epoxy adhesives were made up and tested in the manner described in Example 1 using the formulations shown below. Table I shows the resin component for Examples 2–8. Table II shows the hardener component for Examples 2–8. Example 2 is only a minor variation from Example 1.

TABLE I

| Resin component | Example Number | | | | | | |
|---|---|---|---|---|---|---|---|
| | 2 | 3 | 4 | 5 | 6 | 7 | 8 |
| Liquid Bisphenol A resin (described in Example 1) | 47 | 47 | 47 | 47 | 47 | 47 | 47 |
| Cresyl glycidyl ether | 4.5 | | | 4.5 | 4.5 | 4.5 | 4.5 |
| Butyl glycidyl ether | | 4.5 | | | | | |
| Phenyl glycidyl ether | | | 4.5 | | | | |
| Tetronic 901 | 0.1 | 0.1 | 0.1 | | | | 0.1 |
| Tergitol NPX | | | | 0.1 | | | |
| Tween 60 | | | | | 0.1 | | |
| Span 60 | | | | | | 0.1 | |
| Dibutyl phthalate | 2.0 | 2.0 | 2.0 | 2.0 | 2.0 | 2.0 | |
| Talc | 40 | 40 | 40 | 40 | 40 | 40 | 40 |

TABLE II

| Hardener component | Example Number | | | | | | |
|---|---|---|---|---|---|---|---|
| | 2 | 3 | 4 | 5 | 6 | 7 | 8 |
| Genamid 250 | 40 | 40 | 40 | 40 | 40 | 40 | |
| Genamid 2000 | | | | | | | 40 |
| Epi-Cure 874 | 5.0 | 5.0 | 5.0 | 5.0 | 5.0 | 5.0 | 5.0 |
| Tetronic 901 | 0.1 | 0.1 | 0.1 | | | | 0.1 |
| Tergitol NPX | | | | 0.1 | | | |
| Tween 60 | | | | | 0.1 | | |
| Span 60 | | | | | | 0.1 | |
| Polyester plasticizer | 5.0 | 5.0 | 5.0 | 5.0 | 5.0 | 5.0 | 5.0 |
| Talc | 49.4 | 49.4 | 49.4 | 49.4 | 49.4 | 49.4 | 49.4 |

TABLE III

| | Example Number | | | | | | |
|---|---|---|---|---|---|---|---|
| | 2 | 3 | 4 | 5 | 6 | 7 | 8 |
| Cleanability | Good | Good | Very good | Good | Fair to good | Very good | Very good. |
| Tensile shear, p.s.i. at R.T. etched aluminum (ASTM-D-1002) | 2,197 | 678 | 1,329 | 1,109 | 1,673 | 1,293 | 1,471. |

The amount of filler and other auxiliary type materials which are used in the adhesives of the present invention may be adjusted between the two packages in order to provide for convenient mixing ratios. In other words, it will generally be preferred that the adhesives be made up so that the users can mix equal parts of each package or 2 parts of one package to 1 part of the other package, as is illustrated by the examples, merely for convenience. Adjustment of the proportion of the filler used in each package may be used to change mixing ratios somewhat, but such adjustment also affects the viscosity of the package and is therefore limited in scope.

The adhesives of the present invention may be used to bond metals, glass, wood, plastics and other materials. The type and quantity of accelerators, fillers, plasticizers and other non-essential material used may be adjusted to suit the materials being bonded, as will be apparent to those skilled in the art.

The forms of invention herein shown and described are to be considered only as illustrative. It will be apparent to those skilled in the art that numerous modifications may be made therein without departure from the spirit of the invention or the scope of the appended claims.

I claim:
1. A water cleanable epoxy-based adhesive formed by combining a liquid epoxy resin having an epoxy equivalent weight of from about 170 to about 300; from about 0.05 to about 1% by weight of a water dispersible nonionic surfactant; from about 1.0 to about 10% by weight of a monoglycidyl ether selected from the group consisting of alkyl glycidyl ethers containing from about 2 to 8 carbon atoms, phenyl glycidyl ether, alkyl aryl glycidyl ethers containing up to 12 carbon atoms and mixtures thereof; and a polyamide hardener having a viscosity between about 2 and 40 poises and having an amine number of between about 400 and 650, said polyamide providing from about 90 to 200% of the stoichiometric requirement of amine-hydrogen atoms, based on the epoxy groups present.

2. An adhesive as described in claim 1, wherein said monoglycidyl ether is selected from the group consisting of cresyl glycidyl ether, phenyl glycidyl ether, and butyl glycidyl ether.

3. An adhesive as described in claim 1, wherein said surfactant is selected from the group consisting of liquid condensates of etheylene oxide, propylene oxide and ethylene diamine having a molecular weight of about 4750; condensates of about 10.5 moles of ethylene oxide and one mole of nonylphenol; condensates of about 20 moles of ethylene oxide and one mole of sorbitan monostearate; and sorbitan monostearate.

4. An adhesive as described in claim 1, wherein the polyamide hardener is a condensate of a low molecular weight polyamine and a long chain fatty acid.

5. An adhesive as described in claim 1, wherein adhesive contains an auxiliary hardener in sufficient quantity to react with up to 50% by weight of the epoxy groups present.

6. An adhesive as described in claim 1, wherein said liquid epoxy resin has an epoxy equivalent weight of from about 170 to about 300.

7. An adhesive as described in claim 1, wherein the adhesive composition includes up to about 50% by weight of a filler.

8. An adhesive as described in claim 7, wherein said filler is talc.

References Cited

UNITED STATES PATENTS 2,831,820   4/1958   Aase et al. _____ 260—2.5 Ep
3,154,504   10/1964  Carey et al. _____ 260—2.5 Ep
3,282,863   11/1966  Carey et al. _____ 260—30.4 Ep X LEWIS T. JACOBS, Primary Examiner U.S. Cl. X.R.

260—37 Ep, 830 P